Dec. 4, 1945.    B. SVIRSKY    2,390,134
BALL COCK VALVE STRUCTURE
Filed Dec. 17, 1943
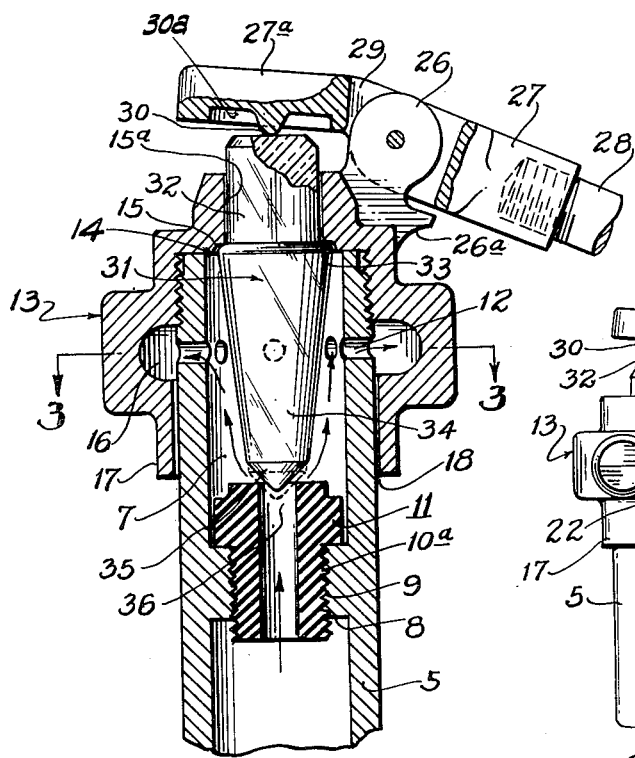
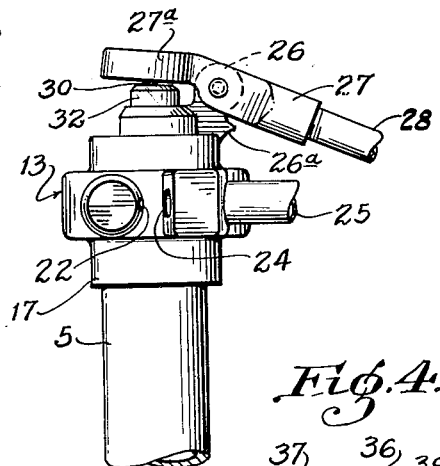
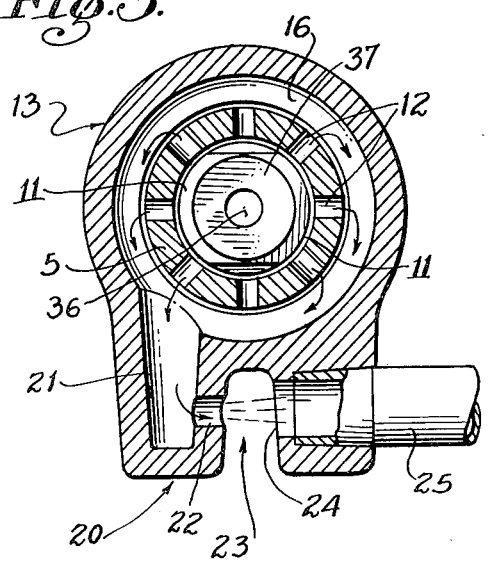
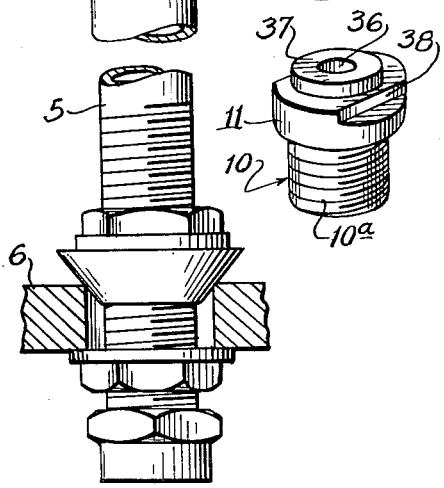
Bennett Svirsky,
INVENTOR.
BY
ATTORNEY.

Patented Dec. 4, 1945

2,390,134

UNITED STATES PATENT OFFICE 2,390,134

BALL COCK VALVE STRUCTURE

Bennett Svirsky, Glendale, Calif.

Application December 17, 1943, Serial No. 514,596

2 Claims. (Cl. 137—104)

This invention relates to improvements in ball cocks and more particularly to the valve structures thereof.

Heretofore in devices of the character to which the present invention pertains, it has been one of the major problems to provide a ball cock for efficient service in both high and low water pressure systems. Although such devices were more or less effective for one or the other conditions mentioned, no one valve truly met both of these conditions satisfactorily in addition to the several other purposes for which the ball cocks must serve. Neither did the valves of such devices approach perfect silencing, nor were the plunger portions of such valves self-cleaning, non-clogging, self-alining and positively closing when abnormally canted slightly out of their axial line of travel.

While the present invention is effective at all pressures, the combination is particularly effective under high pressures since it requires much less leverage to effect a complete shut-off than has heretofore usually been required.

In addition to the object of contributing to the elimination of the objections aforementioned, more specifically speaking it is among the important objects of the invention to provide an improved combination needle valve type glass plunger and rubber seat therefor which by virtue of automatic "gyro" seating of the plunger will assure positive and complete shut-off under all conditions of varying water pressures.

Further important objects include: the provision of a single lever operated ball cock which is more simple in construction, easier to install; a ball cock employing a needle valve type plunger whereon rust or other foreign matter cannot collect or adhere, and one which cannot corrode or stick.

A still further object resides in the novel manner of assembling the related parts wherein the apex portion of the needle valve projects at all times into the water intake passage thereby "funneling" the stream and eliminating any flat surfaces against which the inflowing water may strike to offer unnecessary resistance in closing and opening and also preventing objectionable sound, this being avoided by reason of the streamline character of the valve plunger.

Yet a still further object is to provide, as a new article of manufacture, a valve plunger for ball cocks, said plunger having a tip portion adapted to cooperate in an improved manner with the valve seat portion of the ball cock valve structure.

It is also an object to provide, as a new article of manufacture, an improved valve seat member for the ball cock.

Other objects, advantages and features of invention will hereinafter appear.

Referring to the accompanying drawing wherein is shown the manufactured embodiment of the invention, Fig. 1 is a side elevational view, some parts of which are broken away to contract the view and other parts being shown in cross section.

Fig. 2 is principally an enlarged fragmentary vertical midsection some parts of which are shown in side elevation.

Fig. 3 is a section taken on line 3—3 of Fig. 2, the valve plunger being omitted.

Fig. 4 is a perspective view of the combined screw and gasket washer valve seat.

Referring in detail to the drawing, the upstanding cast supply pipe 5 is positioned and sealed in the floor 6 of a toilet tank. A tubular discharge valve chamber 7 is formed in the upper end of said supply pipe by providing a cross wall 8 in the pipe in a subjacent relation to the pipe's end. Into the threaded aperture 9 of said cross wall in axial alinement with the pipe 5 is screwed the tubular shank portion 10a of a combined screw and gasket washer 10, by means of which the valve seat gasket washer 11, the head of the screw, is secured in an overlying surrounding relation against the floor of said chamber. In the wall of the pipe's valve chamber 7 in a slightly downwardly spaced relation from the mouth of said pipe is provided a series of circumferentially, radially spaced discharge passages 12.

Onto the externally threaded open end of said pipe 5 is screwed a discharge head 13, said head above its threaded portion being contracted to form a plurality of internally stepped annular shoulders 14 and 15, the threaded end of the supply pipe being screwed the full limit into the threads of the head so as to abut said shoulder 14. The shoulder 15 surrounds a tubular opening 15a in the top wall of said head and forms the ceiling of the valve chamber above which it lies.

The head 13 subjacent its threaded portion is outwardly bulged to provide an internal annular, passageway 16, which is approximately semi-circular in cross section and communicates with the annular series of radially spaced discharge passages 12, and below said passageway 16 said bulge terminates in a skirt 17, the inner periphery of which is slightly spaced away from the external surface of the pipe 5 so as to provide an annular channel 18 through which the water flows from the annular passageway 16 into the toilet tank.

At one side, on a level with the annular passageway 16, the bulged portion of the head is furnished with a lateral extension 20. A horizontally directed passage 21 extends from the passageway 16 into said extension 20, this passage having a contracted outlet 22 leading laterally from its outer end portion to discharge the water horizontally across an anti-syphoning gap 23 into a larger, horizontal passage 24 with which said outlet 22 is in axial alinement. With the opposite end of said passage 24 communicates the refill tube 25.

The upper part of the head 13 is provided with an upstanding lug 26 to which is pivoted for vertically swinging the lever 27 which carries the float rod 28, said lever being slotted at 29 in order that its pivoted portion may straddle the upper portion of said lug. A shoulder 26a on the lower side of the lug limits the down travel of the lever. Forwardly of its slot so as to overlie the tubular opening 15a, the lever 27 is provided with a rounded, flat recessed bonnet 27a, from the center of which recess downwardly projects a round-nosed boss 30 which engages abuttingly the flat upper surface of the plunger valve 31. The annular recess 30a in the underside of the bonnet is constructed and arranged to overlie in an upwardly spaced relation the tubular opening 15a.

The plunger 31 is mounted to vertically reciprocate between opening and closing positions in the chamber 7 as indicated by full and dotted lines in Fig. 2, the cylindrical head 32 of the plunger being slidably mounted in the opening 15a with a working fit. The peripheral portion of the cylindrical head 32 is coated with a suitable grease to insure a leak-proof working fit of the cylindrical portion in the bore 15a. Should any perceptible leakage pass by the greased portion of the valve plunger said recess 30a will deflect the liquid downwardly into the tank.

The plunger is preferably constructed of glass with a rounded shoulder adjacent the cylindrical head 32 as indicated by the numeral 33 to seat against the shoulder 15 to limit the plunger's upward travel, the uppermost position of the plunger being shown in full lines in Fig. 2. The rounded shoulder 33 is located at the upper end of the frusto-conically shaped body portion 34 of the plunger to function as a stop shoulder, the portion 34 terminating in a cone-shaped tip 35 of greater taper than the frusto-conically shaped body portion of the plunger to which it is joined. The shoulder 33 also aids in preventing "top-flooding."

By reason of the limited travel of the plunger its conical tip 35 is always in a more or less inserted relation to the passage 36 of the screw-washer 10. Thus it will be seen that in the full line position the water passing over the tip 35 will be developed into a cone shape or funnel sheath and directed upwardly without opposition toward the openings 12 and passage 21 for the intended purpose. Also, by reason of the limited amount of tangential surface against which the water pressure acts to lift the plunger, and of the conical dispersion of the water, the sound produced by the issuing water is reduced to a minimum. This effect is enhanced by reason of the obtuse angle at which the point portion of the valve joins the body portion. Furthermore, the limited amount of tangential pressure against the conical tip 35 and the diminishing of the thickness of the conical spray in the final part of the closing operation requires less lifting force by the float and reduces wear on the pivoted parts, the silencing feature being thus augmented throughout the final seating of the plunger.

The peculiar cooperation of the cone tip and right angular, annular shoulder at the mouth of the washer provides additional advantages in that should the axial alinement of the plunger be otherwise than perfect, due to any canting caused by a too loose fit of the cylindrical portion of the plunger in its tubular bore, said plunger will nevertheless, when seated, completely close the mouth of the aperture 36. This is due, first to the capacity of the plunger for a gyratory movement which will subsequently be automatically corrected due to the manner in which the down-pressed boss 30 bears upon the flat upper surface of the plunger. A perfect, unobstructed seating of the plunger's tip within the mouth of the washer's bore will always be assured owing to the angular, annular shoulder of the valve seat member, producing a hair-contacting surface and affording a minimum space in which foreign matter can collect.

The screw-washer 10 is provided with an annular, central rise 37 around the valve seat opening 36. Said rise is too narrow to allow any foreign matter carried by the incoming stream to collect thereon, and hence prevents such foreign matter from interfering with the perfect functioning of the valve.

The glass tip 35 and the rubber washer 11 are constructed of materials the surface portions of which cooperate well with each other in their oscillatory functioning. Hence these two members, when operatively related to each other in the manner which has been described, cooperate in a highly efficient manner and when the valve is closed produce a more perfect leak proof seal than would result if the cooperating members were composed of harsher substances, or of substances less well adapted repeatedly to contact each other.

In the top surface of the washer element portion 11 are oppositely disposed shoulders 38 for the purpose of creating holds for the application of a wrench. Said shoulders result from making twin diametrically opposite segmental recesses in the washer body 11, which occupy only the upper portion of said body 11 and therefore do not materially interfere with the leak-proof sealing function thereof.

What is claimed is:

1. In a ball cock valve structure, an upstanding supply pipe having an internal cross wall downwardly spaced from its upper end, said cross wall having through it a screwthreaded central aperture, a tubular valve seat member having a shank screwed into said aperture and a valve seat forming head thereabove, a centrally apertured discharge head closing the upper end of said pipe, there being an elongated valve chamber between said centrally apertured discharge head and the valve seat formed by said valve seat forming member as a result of the downward spacing of said internal cross walls, outlet means for said chamber, and a valve plunger having an upper end portion extending through and having a working fit in the aperture of said centrally apertured discharge head, said valve plunger having a frusto-conical body portion and a conical seating portion, said valve plunger having a stop portion which cooperates with said centrally apertured discharge head to restrict the upward travel of the valve thereby keeping the apex of its conical portion at all times within the mouth of the aperture of the valve seat.

2. A ball cock valve structure comprising a valve body provided with a glass valve-forming plunger, said plunger comprising a cylindrical end portion from which projects a frusto-conical portion of one taper which extends to a pointed conical portion of a greater taper, a rubber valve seat member having through its seat portion a circular opening surrounded by a right angular annular shoulder against which said conical portion seats with a hair-line contact, operating means carried by said valve body cooperating with said plunger to form a complete ball cock structure and stop means carried by said ball cock structure and cooperating with said plunger whereby the travel of the latter is sufficiently restricted to at all times prevent the withdrawal of the point of said plunger from the mouth of the opening through said valve seat.

BENNETT SVIRSKY.